(12) United States Patent
Kim et al.

(10) Patent No.: US 7,761,099 B2
(45) Date of Patent: Jul. 20, 2010

(54) METHOD FOR DISCOVERING WIRELESS NETWORK FOR INTER-SYSTEM HANDOVER, MULTI-MODE TERMINAL UNIT AND INTER-WORKING SERVICE SERVER USING THE METHOD

(75) Inventors: Won-Ik Kim, Seoul (KR); Bong-Ju Lee, Jeollabuk-do (KR); Jae-Su Song, Daejeon (KR); Sung-gu Choi, Daejeon (KR); Yeon-Seung Shin, Daejeon (KR)

(73) Assignees: Electronics and Telecommunications Research Institute, Daejeon (KR); SK Telecom Co., Ltd., Seoul (KR); Ktfreetel Co., Ltd., Seoul (KR)

( * ) Notice: Subject to any disclaimer, the term of this patent is extended or adjusted under 35 U.S.C. 154(b) by 1065 days.

(21) Appl. No.: 11/446,786

(22) Filed: Jun. 5, 2006

(65) Prior Publication Data

US 2007/0123260 A1     May 31, 2007

(30) Foreign Application Priority Data

Nov. 28, 2005   (KR) ...................... 10-2005-0114019

(51) Int. Cl.
*H04W 36/00* (2009.01)
*H04W 24/00* (2009.01)

(52) U.S. Cl. .................................... 455/436; 455/456.1
(58) Field of Classification Search ................. 455/436, 455/439, 456.1
See application file for complete search history.

(56) References Cited

U.S. PATENT DOCUMENTS

| | | | | |
|---|---|---|---|---|
| 5,267,261 | A * | 11/1993 | Blakeney et al. | 370/332 |
| 7,089,005 | B2 * | 8/2006 | Reddy | 455/436 |
| 7,151,941 | B2 * | 12/2006 | Vanttinen et al. | 455/456.2 |
| 2003/0048762 | A1 | 3/2003 | Wu et al. | |
| 2004/0023669 | A1 | 2/2004 | Reddy et al. | |

(Continued)

FOREIGN PATENT DOCUMENTS

KR    10-2004-0008148    1/2004

(Continued)

OTHER PUBLICATIONS

"An Adaptive Scheme for Vertical Handoff in Wireless Overlay Networks," Chen, Wen-Tsuen, et al.; Proceedings of the Tenth International Conference on Parallel and Distributed Systems, IEEE Computer Society, 2004.

*Primary Examiner*—Marivelisse Santiago-Cordero
(74) *Attorney, Agent, or Firm*—Ladas & Parry LLP (57) ABSTRACT

In a wireless network discovery method according to an exemplary embodiment of the present invention, a) a propagation environment information message generated by using signal information received from the heterogeneous wireless networks is transmitted to the common core network, b) a wireless network discovery range generated by using the propagation environment information message is received from the common core network, c) it is determined if signal information received from a serving wireless network at a current location corresponds to the wireless network discovery range, and d) when the signal information corresponds to the wireless network discovery range in c), a network within the wireless network discovery range is discovered, when the signal information does not correspond to the wireless network discovery range in c), c) is periodically performed.

4 Claims, 8 Drawing Sheets

U.S. PATENT DOCUMENTS

| | | | |
|---|---|---|---|
| 2004/0203792 A1* | 10/2004 | Shaheen et al. | 455/444 |
| 2005/0107085 A1* | 5/2005 | Ozluturk | 455/439 |
| 2007/0087763 A1* | 4/2007 | Budampati et al. | 455/456.5 |

FOREIGN PATENT DOCUMENTS

| | | |
|---|---|---|
| KR | 10-2004 0058934 | 7/2004 |
| KR | 10-2005 0052172 | 6/2005 |
| WO | WO02/082832 | 10/2002 |
| WO | WO2005071998 | 8/2005 |

\* cited by examiner

METHOD FOR DISCOVERING WIRELESS NETWORK FOR INTER-SYSTEM HANDOVER, MULTI-MODE TERMINAL UNIT AND INTER-WORKING SERVICE SERVER USING THE METHOD

CROSS-REFERENCE TO RELATED APPLICATION

This application claims priority to and the benefit of Korean Patent Application No. 10-2005-0114019 filed in the Korean Intellectual Property Office on Nov. 28, 2005, the entire contents of which are incorporated herein by reference.

BACKGROUND OF THE INVENTION (a) Field of the Invention

The present invention relates to a wireless network discovery method for intersystem handover, and a multi-mode terminal and a service server using the wireless network discovery method.

(b) Description of the Related Art

It is expected that, in a next generation wireless network, internet protocol (IP)-based wireless packet access networks having various characteristics for satisfying subscriber's increasing requirements including a high quality multimedia service, a single contact number, and a low price, will concurrently exist and have overlapped service coverage areas. In a heterogeneous wireless network environment, service coverage areas of wireless networks respectively having different characteristics and inter-working with each other are overlapped so that a service subscriber may selectively connect to an optimum network according to location, propagation environment, service characteristics, and user preferences.

To provide optimized performance and a seamless service to a service subscriber in the heterogeneous wireless networks, it is highly required to perform an inter-system handover (ISHO) between the heterogeneous wireless networks, the inter-system handover for changing an access path of a current service to the optimum wireless network according to a location of a multi-mode terminal (hereinafter, also referred to as a "terminal") and the propagation environments. To perform the ISHO between the heterogeneous wireless networks, it is firstly required that the terminal acknowledges a propagation environment of a system other than a serving system that receives a current service so as to discover wireless networks for providing services at a current location of the terminal.

In addition, to provide a wideband data rate for the multi-mode terminal having high speed mobility that is one of service goals of the next generation wireless network, it is required to quickly and efficiently discover the wireless networks for providing the services. It is highly required to provide a method for efficiently discovering the wireless network so that the next generation wireless network is successfully realized.

In addition, while it is preferred that a multi-modem of the multi-mode terminal may be realized by a single modem integrating modem modules respectively having different characteristics, the multi-modem will be realized by providing a plurality of separate modems to a terminal before a method for integrating multi-modems is fully developed.

Accordingly, when a wireless network discovery operation is performed, in the multi-mode terminal having the plurality of separated modems, there is a problem in that power consumption may be increased according to a multi-modem activation mechanism or that the wireless networks may not be quickly discovered.

Conventional network discovery methods include a periodic modem activation (PMA) method and an ideal coverage based periodic modem activation (IcPMA) method.

Firstly, in the PMA method, modem interfaces of the multi-mode terminal are activated to measure strengths of signals received from the wireless networks. In this case, a modem activating period differently affects a quick network discovery and an efficient power use, which are main performance parameters for discovering the wireless network. That is, while the wireless network may be quickly discovered when the modem activating period is set to be short, the power consumption of the terminal may be increased since the modem is frequently activated. In addition, while a power source may be efficiently used when the modem activating period is set to be long, an optimum service environment may not be quickly provided to a user since it is slow to discover the wireless network to be used.

In the IcPMA method, location based techniques including a radio frequency (RF) triangulation technique and a global positioning system (GPS) technique are used to quickly discover the wireless network. The IcPMA method is to actively control the modem activating period of the terminal based on information on ideal service coverage of the plurality of wireless networks and a current location of the terminal, the current location provided from a location-based service (LCS) server.

In the IcPMA method, the unnecessary power consumption may be prevented since the ideal service coverage including actual service coverage which varies in relation to time and space is set and the modem activating period for discovering a received signal is set to be short when the terminal enters the ideal service coverage.

However, the power consumption of the terminal may be steeply increased by only using the location-based technique provided to the multi-mode terminal, and therefore it is not efficient. In addition, a service coverage area of a hot-spot wireless network in a metropolitan area does not have a fixed form such as a conceptual propagation model. Therefore, even when the modem is activated in the ideal coverage area, a propagation signal of the wireless network having the hot-spot may not be detected. Therefore, the ideal service coverage area is set to be similar to a geographical shape of the actual service area, but to set the ideal service coverage as above, it is required to continuously detect a location of a hot-spot wireless access base station. Therefore, there is a problem in managing the wireless network (i.e., in managing information on the location of an access base station).

In Korean Patent Laid-Open Publication No. 2004-58934 (published in Jul. 5, 2004) as the prior art, a method for processing a multi-mode service of a mobile communication terminal using a global positioning system (GPS) has been disclosed, in which the GPS measures information on a location of a dual-mode terminal and a method for performing handover between a 2 G system and a 3 G system by using the information is provided.

In the above Korean Patent Laid-Open Publication No. 2004-58934, the multi-mode terminal uses the GPS technique in the dual-mode terminal to discover and select heterogeneous networks rather than activating heterogeneous modems.

In addition, Korean Patent Laid-Open Publication No. 2005-52172 (published on Jun. 2, 2005) provides a method in which the multi-mode terminal determines a network system by using information on a location of a terminal detected by the GPS.

In the above Korean Patent Laid-Open Publication No. 2005-52172, when network system information is not obtained in a multi-mode communication environment (code division multiple access (CDMA), wideband code division multiple access (WCDMA), global system for mobile communication (GSM)), a communication mode at a corresponding location is determined by using the information on the current location obtained by the GPS, and information on a corresponding network system is obtained based on the determined communication mode to perform the communication.

In addition, a transaction entitled "An Adaptive Scheme for Vertical Handoff in Wireless Overlay Networks" by Wen-Tsuen et al. in the IEEE ICPADS 04 (published in 2004) discloses a method for detecting heterogeneous systems by using the GPS without activating all the modems in the multi-mode terminal.

In the above transaction in IEEE ICPADS 04, when locations of a terminal and a base station of a predetermined system are obtained by using the GPS and the terminal is in an imaginary propagation radius of the base station of the predetermined system, a handover to the corresponding system may be performed.

However, since additional techniques including the GPS technique are required in the above prior art, there are problems in that costs are increased and battery consumption is increased at the terminal.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a wireless network discovery method having advantages of reducing power consumption and a discovery time in heterogeneous wireless networks.

An exemplary method according to an embodiment of the present invention is for discovery of a wireless network to which a multi-mode terminal accessing respective networks performs a handover operation through a common core network for providing an inter-working operation to overlapped heterogeneous wireless networks. In the exemplary method, a) a propagation environment information message generated by using signal information received from the heterogeneous wireless networks is transmitted to the common core network, b) a wireless network discovery range generated by using the propagation environment information message is received from the common core network, c) it is determined if signal information received from a serving wireless network at a current location corresponds to the wireless network discovery range, and d) when the signal information received from the serving wireless network corresponds to the wireless network discovery range in c), a network within the wireless network discovery range is discovered, and when the signal information received by the serving wireless network does not correspond to the wireless network discovery range in c), c) is periodically performed.

An exemplary method according to another embodiment of the present invention provides wireless network discovery information for a handover operation to a multi-mode terminal by an inter-working service server in a common core network providing an inter-working operation to overlapped heterogeneous wireless networks, the multi-mode terminal accessing respective heterogeneous wireless networks through the common core network. In the exemplary method, a) a propagation environment information message including signal information of the heterogeneous wireless networks is received from the multi-mode terminal, b) the signal information in the propagation environment information message is divided into sections according to distances to the multi-mode terminal, c) a crossing region of the sections divided in b) is selected as a wireless network discovery range, d) the signal information of the heterogeneous wireless networks received in a) is stored in the wireless network discovery range, and e) the wireless network discovery range is transmitted to the multi-mode terminal.

An exemplary multi-mode terminal for accessing respective wireless networks through a common core network providing an inter-working operation to heterogeneous wireless networks according to an exemplary embodiment of the present invention includes a wireless interface unit, a network discovery unit, a message generation unit, and a modem selection unit. The wireless interface unit performs a wireless interface operation with the common core network. The network discovery unit receives signal information from the heterogeneous wireless networks through the wireless interface unit, receives a wireless network discovery range from the common core network (here, the wireless network discovery range includes a crossing region of sections formed by dividing the signal information of the heterogeneous wireless networks according to distances to the multi-mode terminal), determines if the signal information from the heterogeneous wireless networks corresponds to the wireless network discovery range, and determines if a corresponding wireless network modem is to be activated according to a wireless network discovery range determination result. The message generation unit generates a propagation environment information message by using the signal information received from the network discovery unit, and transmits the propagation environment information message to the common core network through the wireless interface unit. The modem selection unit selects a wireless network modem to be activated according to the wireless network discovery range determination result of the network discovery unit.

An exemplary inter-working service server for accessing a multi-mode terminal through a common core network, the inter-working service server being positioned in the common core network for providing an inter-working operation to heterogeneous wireless networks, includes a transmit/receive unit, a network discovery information storage unit, a range selection unit, and a signal strength recording unit. The transmit/receive unit performs an interface operation with the multi-mode terminal that is accessed to the common core network. The network discovery information storage unit receives a propagation environment information message through the transmit/receive unit (here, the propagation environment information message includes signal information received from the heterogeneous wireless networks), divides the signal information in the propagation environment information message into sections according to distances to the multi-mode terminal, and stores a crossing region of the divided sections. The range selection unit determines if the received signal information in the propagation environment information message received through the transmit/receive unit corresponds to the crossing region stored in the network discovery information storage unit, and selects the received signal information as a network discovery range when the received signal information corresponds to the crossing region stored in the network discovery information storage

DETAILED DESCRIPTION OF THE EMBODIMENTS

An exemplary embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. When it is described that an element is coupled to another element, the element may be directly coupled to the other element or coupled to the other element through a third element. In addition, the word "module" will be understood to indicate a unit for processing a predetermined function or operation, which may be realized by hardware, software, or a combination thereof.

Figure 1:
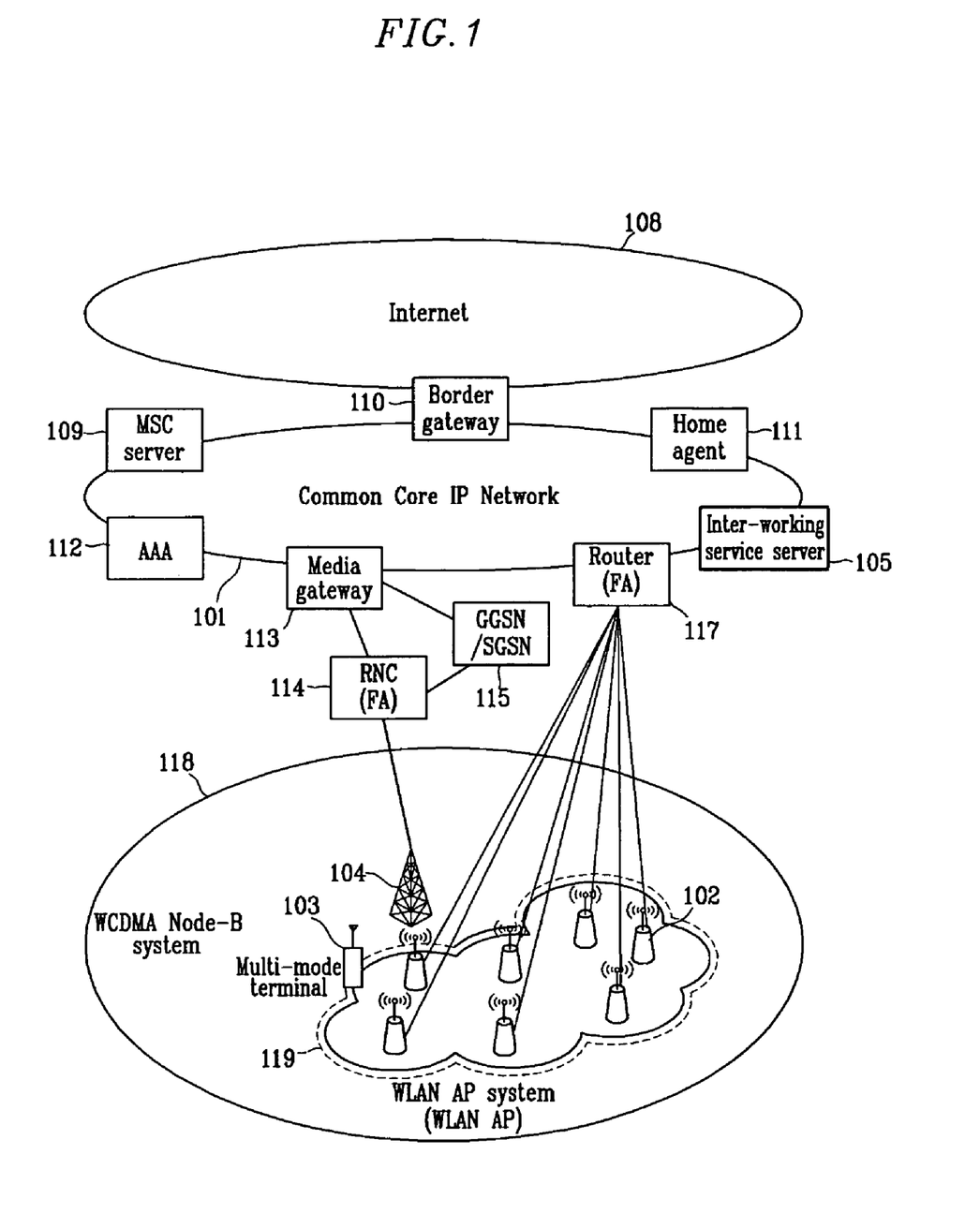
FIG. 1 shows a diagram of a configuration of a heterogeneous wireless network environment according to an exemplary embodiment of the present invention.

FIG. 1 shows a diagram of a configuration of a heterogeneous wireless network environment according to an exemplary embodiment of the present invention.

As shown in FIG. 1, the heterogeneous wireless network environment according to the exemplary embodiment of the present invention includes a hot-spot region formed by one macro cell having a plurality of micro cells or pico cells, and Internet protocol (IP)-based heterogeneous wireless networks respectively having service areas that are overlapped with each other.

The heterogeneous wireless networks will now be described, and a wireless local area network (WLAN) system and a wideband code division multiple access (WCDMA) system will be exemplified as the heterogeneous wireless networks.

That is, FIG. 1 illustrates theoretical propagation ranges of respective wireless network systems in the heterogeneous wireless network environment including the WLAN system 119 and the WCDMA system 118. The respective wireless network systems may access a common core network 101 for an inter-working operation between the heterogeneous wireless networks.

Constituent elements of the respective wireless network systems will now be described.

The WCDMA system 118 includes a mobile switching center (MSC) server 109, a gateway general packet radio service (GPRS) support node (GGSN)/serving GPRS support node (SGSN) 115, and a radio network controller (RNC) (foreign agent (FA)) 114, as respective access nodes forming the wireless access network and the core network.

The WLAN system 119 includes a router 117. The router 117 has an FA function to access the WLAN system 119 to the common core network 101.

The common core network 101 provides an inter-working operation to the heterogeneous wireless network systems so that the respective wireless network systems can access each other.

The common core network 101 includes a border gateway (G/W) 110, a home agent (HA) 111, an authentication, authorization, accounting (AAA) unit 112, and a media gateway (MG) 113.

The border gateway (G/W) 110 provides access to an Internet network 108 from the common core network 101 generated by integrating the WCDMA system 118 and the WLAN system 119.

The HA 111 as an imaginary router that maintains information on a current location of a subscriber in a mobile IP environment.

The AAA unit 112 in the common core network 101 performs authentication and security operations on users when the inter-working operation is performed in the respective heterogeneous wireless network systems or between the respective heterogeneous wireless network systems.

The MG 113 is an access point from a wireless access network of the WCDMA system 118 to the common core network.

The common core network 101 includes an inter-working service server 105. The inter-working service server 105 includes hot-spot discovery range information which is reference information for inter-working with the hot-spot WLAN system, which will be described later in the specification.

The following is set forth beforehand to providing the inter-working operation to the respective heterogeneous wireless networks according to the exemplary embodiment of the present invention.

1. The common core network 101 to which the heterogeneous wireless networks are accessed for performing the inter-working operation is provided.

2. The common core network 101 includes an inter-working service server 105.

3. The inter-working service server 105 includes the hot-spot discovery range information which is the reference information for inter-working with the WLAN system 119.

4. A multi-mode terminal 103 may access the wireless networks systems that access the common core network 101. The multi-mode terminal 103 includes separated modem modules respectively having different characteristics.

5. The two wireless network systems having respective propagation ranges are overlapped with each other.

Based on the above premises, a wireless network discovery operation is performed in three processes as follows.

1. A hot-spot WLAN discovery range of the inter-working service server 105 is formed by the multi-mode terminal 103 activating an initial power source.

2. The multi-mode terminal 103 that accesses the WCDMA system 118 receives information on the hot-spot WLAN discovery range from the inter-working service server 105.

3. The multi-mode terminal 103 uses the received information on the hot-spot WLAN discovery range to perform the hot-spot WLAN discovery operation rather than activating the WLAN modem module.

The wireless network discovery operation will now be described. The multi-mode terminal 103 supports the WCDMA system 118 and the WLAN system 119. In addition, in the exemplary embodiment of the present invention, it will be described, with reference to the figures, that a serving system on the current location of the multi-mode terminal 103 is the WCDMA system 118 and the hot-spot WLAN discovery operation for the handover is performed.

Figure 2:
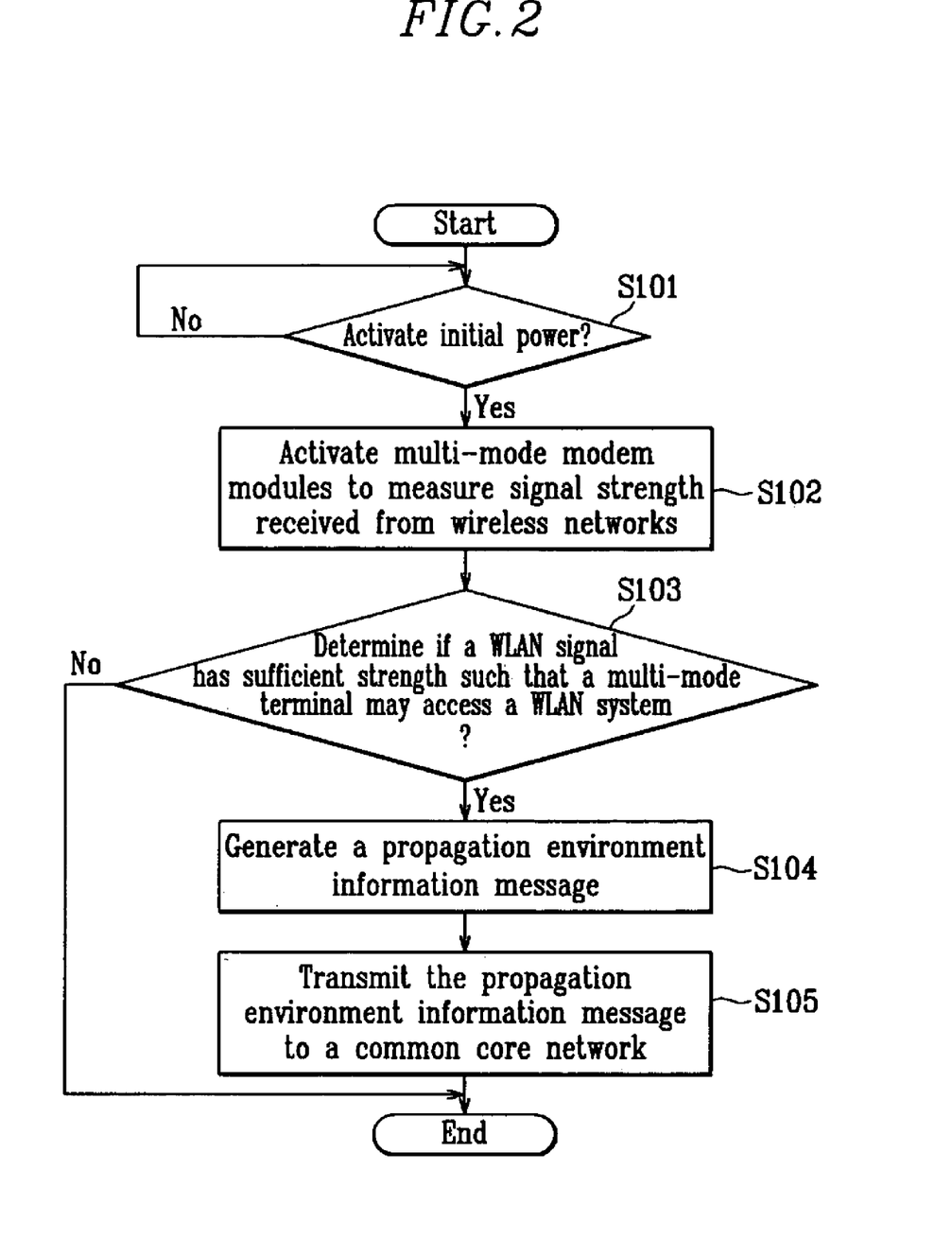
FIG. 2 shows a flowchart representing a process for generating propagation environment information of the multi-mode terminal according to the exemplary embodiment of the present invention.

FIG. 2 shows a flowchart representing a process for generating propagation environment information of the multi-mode terminal according to the exemplary embodiment of the present invention.

As shown in FIG. 2, when an initial power source is activated in step S101, the multi-mode modem modules (i.e., the WLAN and WCDMA modem modules) are concurrently activated, signals from the two wireless network systems 118 and 119 are received, and strengths thereof are measured in step S102.

After measuring the strengths of the received signals in step S102, it is determined in step S103 whether the strength of the signal from the WLAN system 119 is sufficiently strong for connection with the multimode terminal 103. If the signal is sufficiently strong, a propagation environment information message is generated in step S104 based on the measured strengths of the signals received from the two wireless network systems 118 and 119 in step S102. The propagation environment information message includes a strength value of the signal received from the WCDMA system 118, a base station identifier (ID), and a strength value of the signal received from the WLAN system 119. The base station identifier ID includes a serving base station ID of the multi-mode terminal 103 and a neighboring base station ID.

Then, the propagation environment information message generated in step S104 is transmitted to the inter-working service server 105 in the common core network 101 in step S105.

Figure 3:
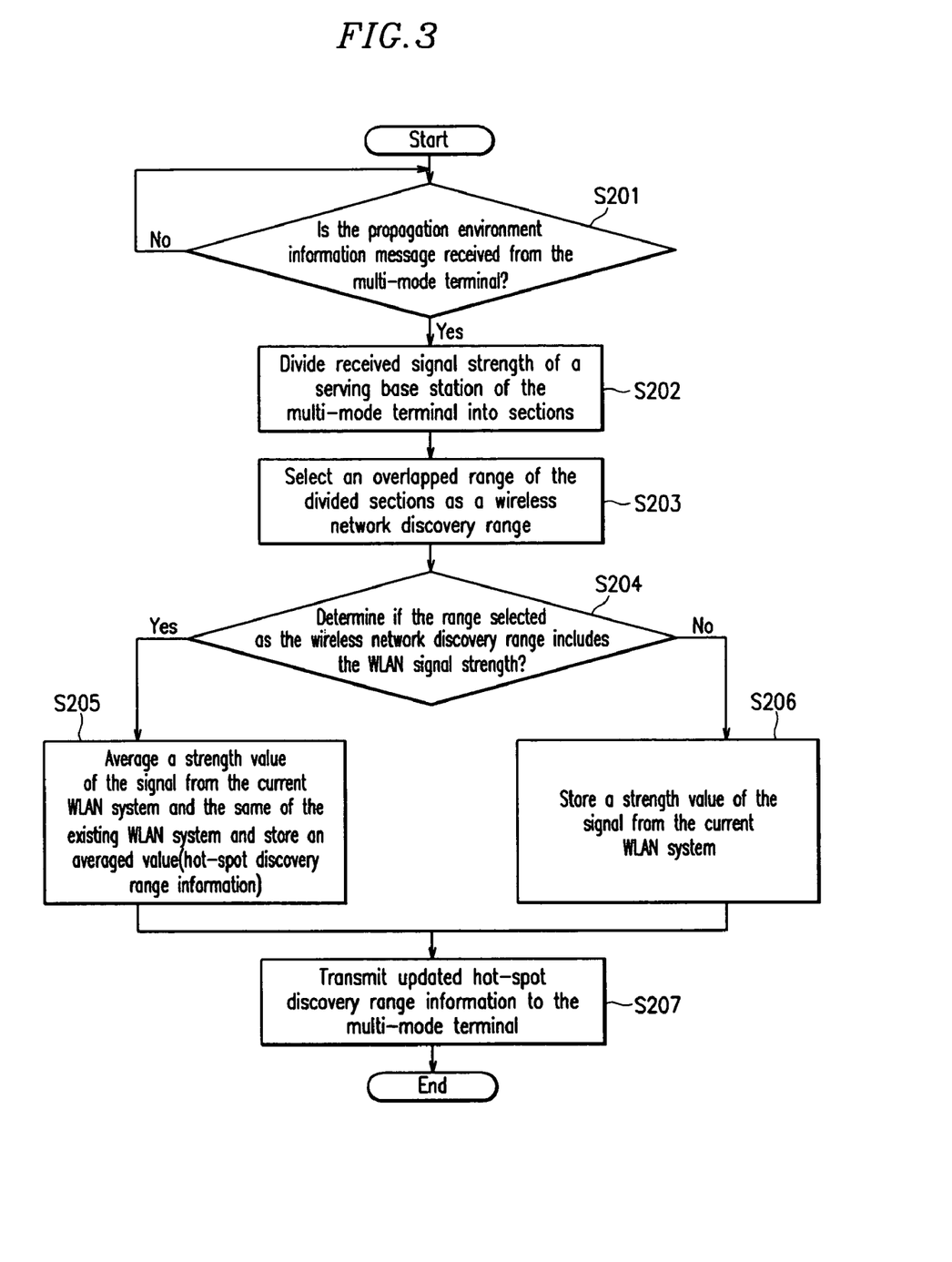
FIG. 3 shows a flowchart representing a process for forming the wireless network discovery range of the inter-working service server according to the exemplary embodiment of the present invention.

FIG. 3 shows a flowchart representing a process for forming the wireless network discovery range of the inter-working service server according to the exemplary embodiment of the present invention.

As shown in FIG. 3, the inter-working service server 105 in the common core network 101 receives the propagation environment information message including received signal information of the WCDMA system 118 and the WLAN system 119 from the multi-mode terminal 103 that is accessible to the common core network 101 in step S201. In this case, the propagation environment information message in step S201 is the same as the propagation environment information message generated in step S104.

Subsequently, the strength of the received signal of the base station 104 of the WCDMA system 118 is divided into sections according to distances to the multi-mode terminal 103 in step S202.

In addition, an overlapped range of the sections divided in step S202 is selected as the wireless network discovery range (i.e., the hot-spot WLAN discovery range) in step S203.

Subsequently, it is determined in step S204 if the hot-spot WLAN discovery range selected in step S203 includes the strength value of the signal from the existing WLAN system 119.

When the hot-spot WLAN discovery range selected in step S203 includes the strength value of the signal from the existing WLAN system 119, the strength value of the signal from the current WLAN system 119 and the same of the existing WLAN system 119 are averaged to update the strength value of the signal from the existing WLAN system 119 in step S205.

When the hot-spot WLAN discovery range selected in step S203 does not include the strength value of the signal from the existing WLAN system 119, the strength value of the signal from the current WLAN system 119 is stored in step S206.

Subsequently, the hot-spot WLAN discovery range having the updated strength value of the signal from the WLAN system 119 is transmitted to the multi-mode terminal 103 in step S207.

Figure 4:
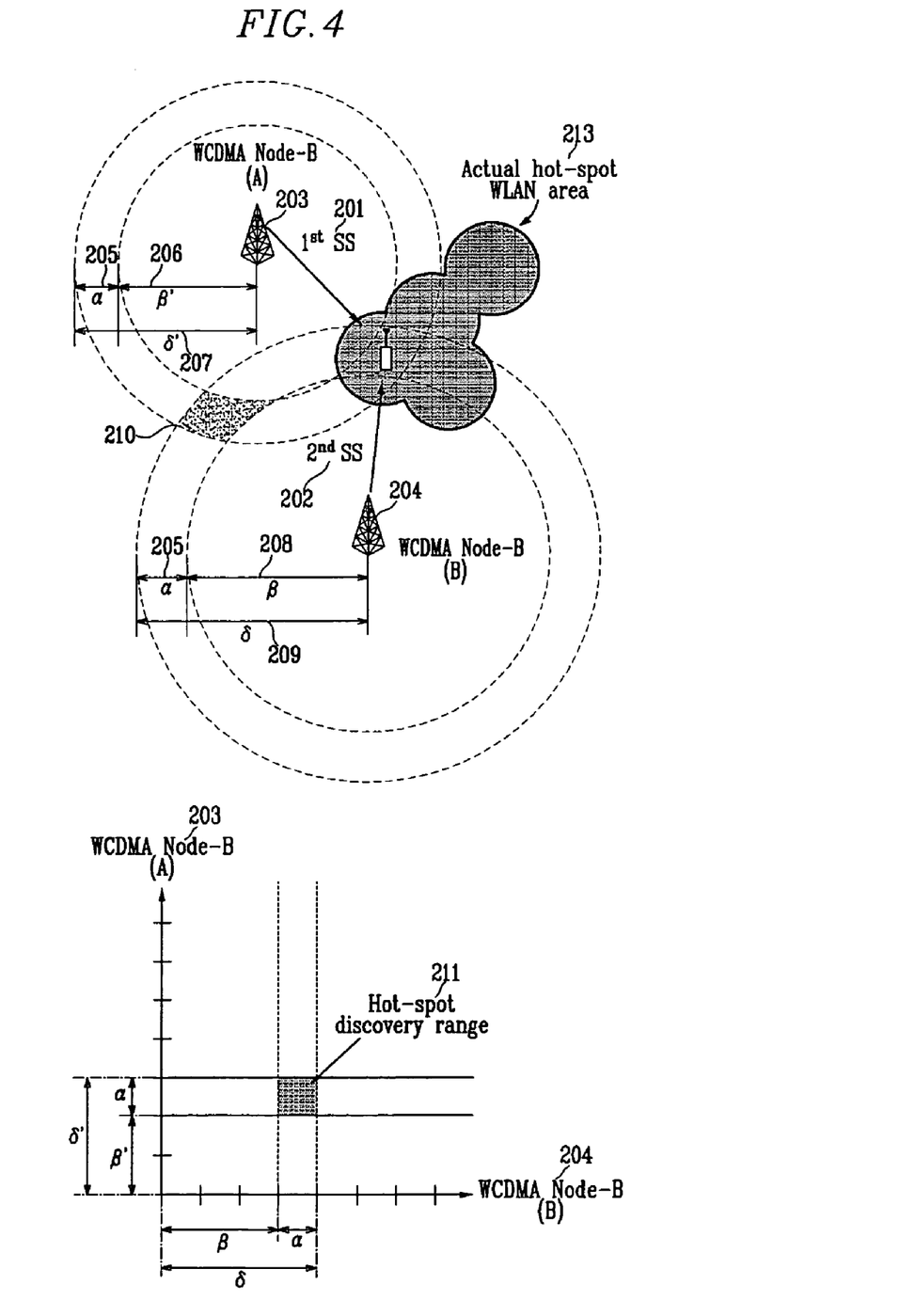
FIG. 4 shows a diagram for exemplifying an initial formation of a wireless network discovery range in FIG. 3.

FIG. 4 shows a diagram for exemplifying an initial formation of the hot-spot WLAN network discovery range in steps S202 and S203.

Referring to FIG. 4, a difference of the sections divided in step S202 corresponding to $\alpha$ 205 may be shown as a two dimensional map. In this case, an optimum value of $\alpha$ 205 may be determined by performance and database capacity of the inter-working service server 105, and by a field test.

In addition, when assuming that a received signal strength value at a Node-B (A) 203 is between $\delta'$ 207 and $\beta'$ 206 and the received signal strength value at a Node-B B 204 is between $\delta$ 209 and $\beta$ 208, an overlapped range of the signal strength values of WCDMA base stations (i.e., the signal strength values in the propagation environment information message, and the Node-B (A) 203 and the Node-B (B) 204) is set as the hot-spot WLAN discovery range 211 as shown in FIG. 4.

However, the inter-working service server 105 may determine an area 210 shown in FIG. 4 as the hot-spot WLAN discovery range even though it is not the hot-spot WLAN discovery range, because only the two WCDMA base stations 203 and 204 are described for convenience of description in the exemplary embodiment of the present invention.

However, when the hot-spot WLAN discovery range is generated by using the strength values of the signals from at least three WCDMA base stations in order to increase reliability of the hot-spot WLAN discovery range, the reliability may be increased without an error as when the area 210 is identified.

Figure 5:
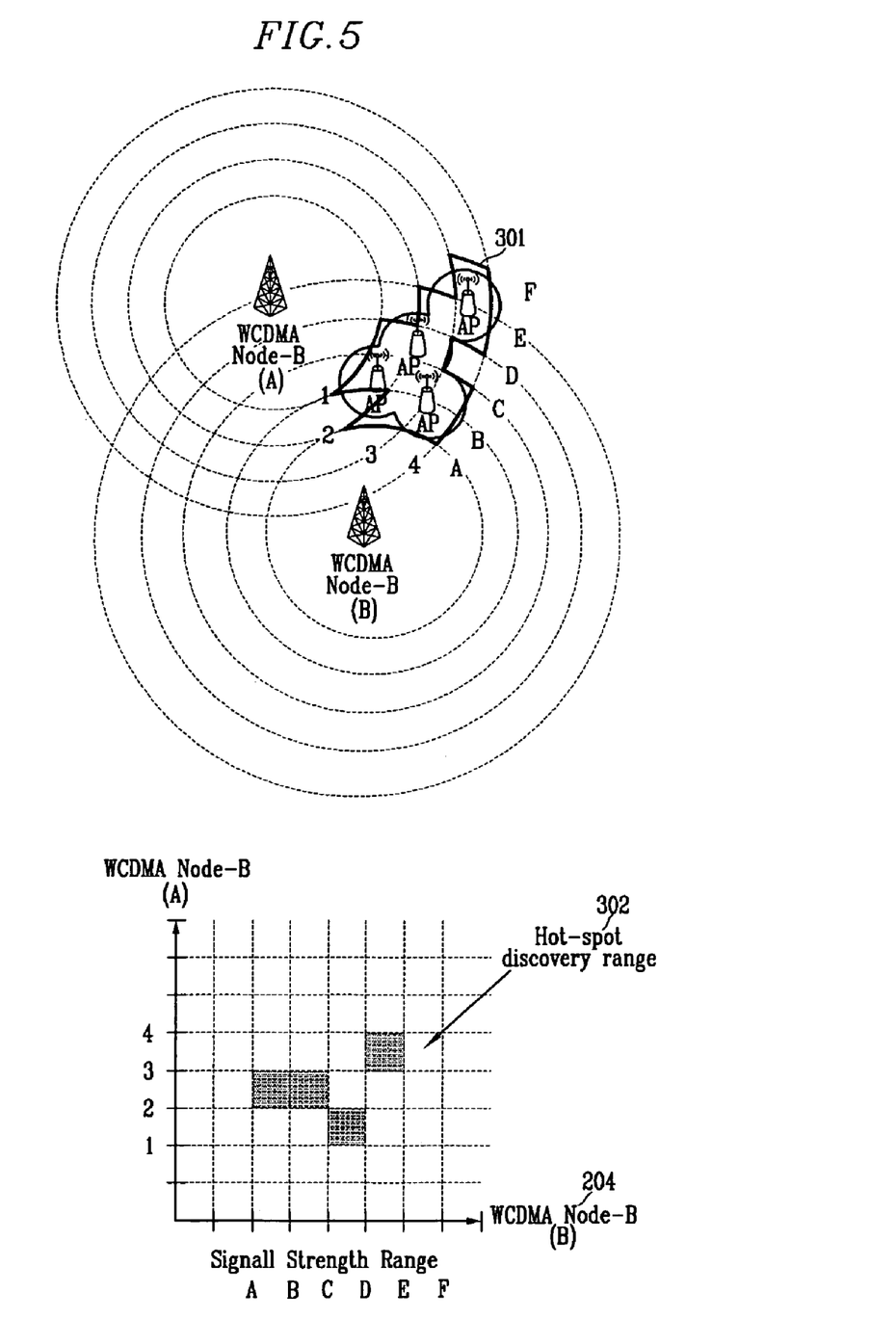
FIG. 5 shows a diagram for exemplifying a final formation of the wireless network discovery range information.

FIG. 5 shows a diagram for exemplifying final formation of an imaginary WLAN hot-spot service coverage 301 that is determined to be similar to the actual hot-spot WLAN service coverage in steps S202 and S203, and the hot-spot WLAN network discovery range 302 provided to the multi-mode terminal 103.

Figure 6:
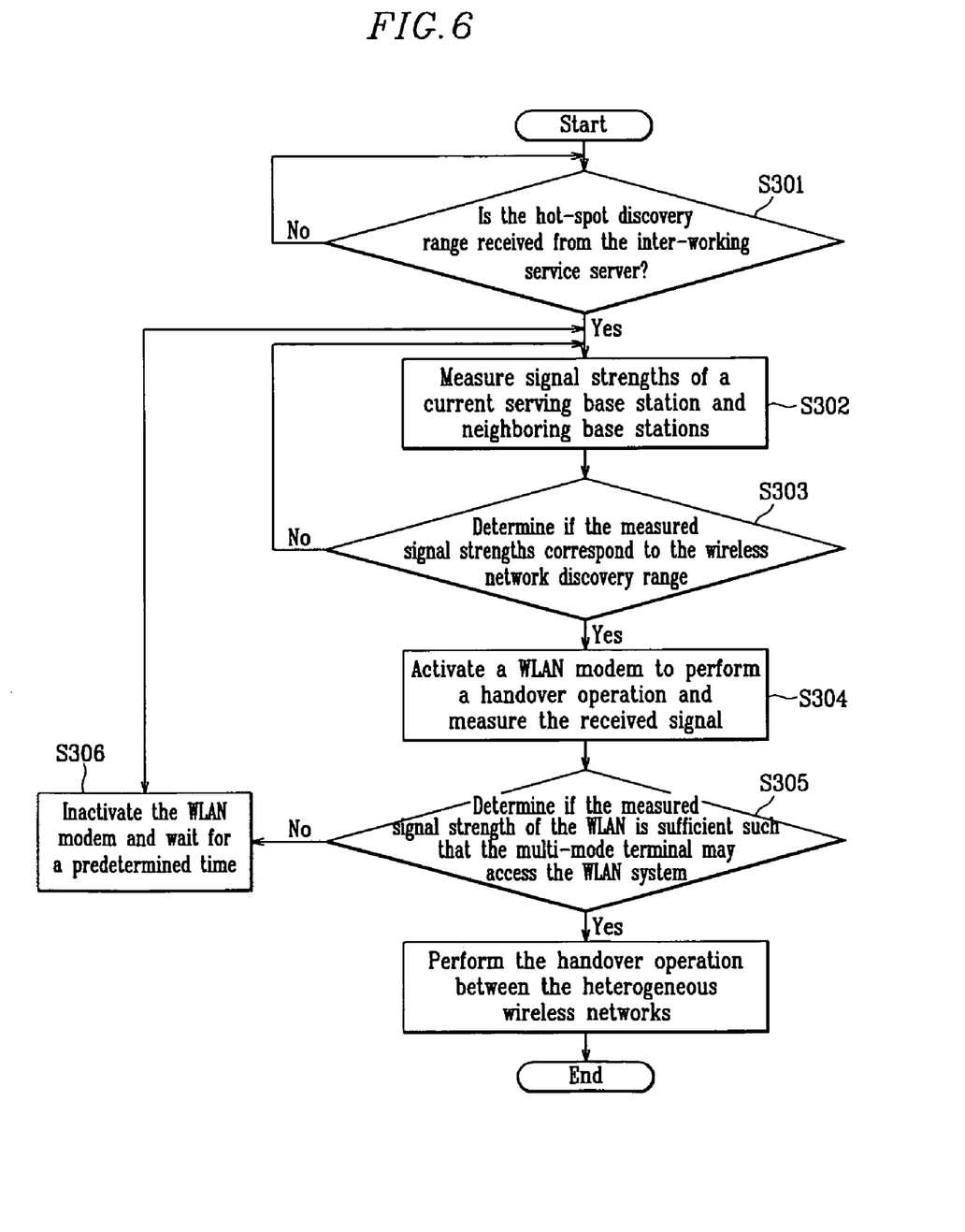
FIG. 6 shows a flowchart for representing a wireless network discovery process of the multi-mode terminal according to the exemplary embodiment of the present invention.

FIG. 6 shows a flowchart for representing a wireless network discovery process of the multi-mode terminal according to the exemplary embodiment of the present invention.

As shown in FIG. 6, the multi-mode terminal 103 receives the hot-spot WLAN discovery range from the inter-working service server 105 in step S301.

Subsequently, signals of a current WCDMA serving base station and neighboring base stations are received, and strengths thereof are measured in step S302.

It is determined in step S303 if the signal strength measured in step S302 is within the hot-spot WLAN discovery range received in step S301.

When the received signal strength of the current WCDMA serving base station corresponds to the hot-spot WLAN discovery range, the WLAN modem is activated to perform a handover operation and the signal is received in step S304.

When the received signal strength of the current WCDMA serving base station does not correspond to the hot-spot WLAN discovery range, the steps S302 and S303 are repeatedly performed until the signal strength corresponding to the hot-spot WLAN discover range is received.

Then, it is determined in step S305 if the strength of the WLAN signal received in step S304 is sufficient such that the multi-mode terminal may access the WLAN system.

When the strength of the signal received in step S304 is sufficient for access, the handover operation to the WLAN system 119 corresponding to the received signal is performed in step S307.

When the strength of the signal received in step S304 is not sufficient for access, the WLAN modem is inactivated, and it pauses for a predetermined time. In this case, after setting an activation period of the WLAN modem, the steps S302, S303, S304, and S305 are repeatedly performed for each period in step S306.

Figure 7:
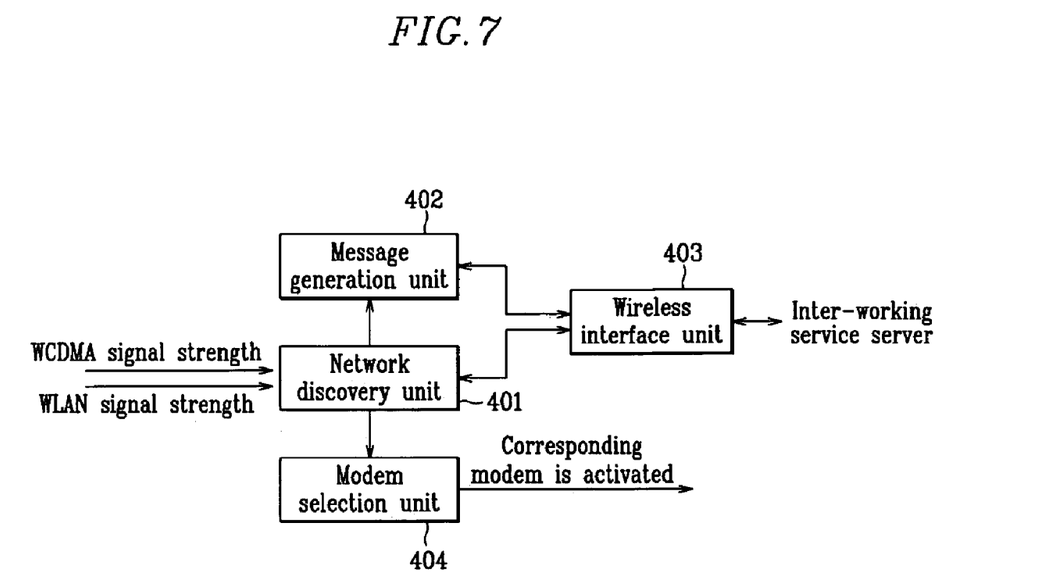
FIG. 7 shows a diagram of a configuration of the multi-mode terminal according to the exemplary embodiment of the present invention.
Figure 8:
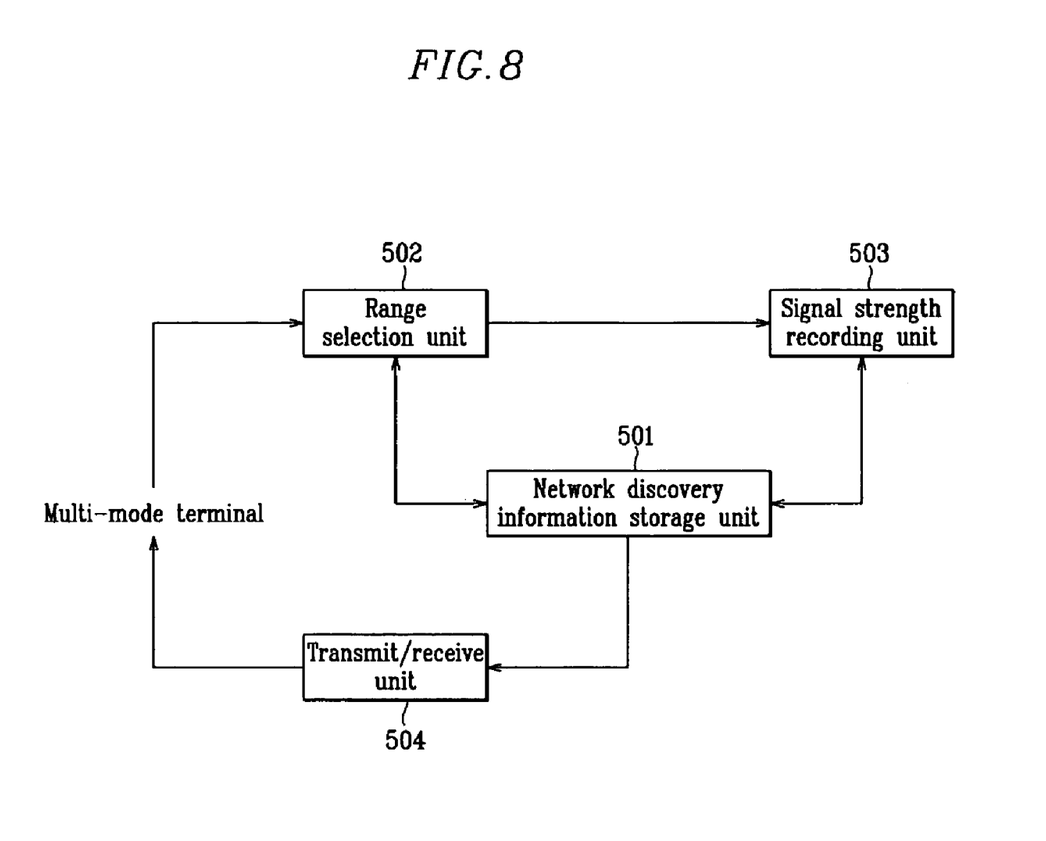
FIG. 8 shows a diagram of a configuration of the inter-working service server according to the exemplary embodiment of the present invention.

Configurations of the multi-mode terminal and the inter-working service server will now be described.

FIG. 7 shows a diagram of the configuration of the multi-mode terminal according to the exemplary embodiment of the present invention.

As shown in FIG. 7, the multi-mode terminal 103 includes a network discovery unit 401, a message generation unit 402, a wireless interface unit 403, and a modem selection unit 404. The multi-mode terminal 103 may access the respective wireless networks through the common core network providing the inter-working operation to the heterogeneous wireless networks.

The network discovery unit 401 receives the strengths of the signals received from the WCDMA serving base station of the multi-mode terminal 103 and the neighboring base stations and the strength of the signal received from the WLAN system. In addition, the network discovery unit 401 determines if the strength of the signal received from the WLAN system is sufficient for access. When the strength of the signal received from the WLAN system is sufficient, the received signal strength values of the WCDMA base stations and the WLAN system are transmitted to the message generation unit 402. In addition, the network discovery unit 401 uses the hot-spot WLAN discovery range received from the inter-working service server 105 to determine a modem for performing the hot-spot WLAN discovery for the handover operation (i.e., a modem to be activated), and transmits information on the determined modem to the modem selection unit 404.

The message generation unit 402 generates the propagation environment information message based on a WCDMA base station identifier, and the signal strength values of the WCDMA base stations and the WLAN system, the signal strength values being received from the network discovery unit 401.

The wireless interface unit 403 is accessed to the common core network 101 for providing the inter-working operation to the heterogeneous wireless networks and performs a wireless interface operation with the heterogeneous wireless networks. That is, the wireless interface unit 403 transmits the propagation environment information message generated by the message generation unit 402 to the common core network 101. In addition, the wireless interface unit 403 receives the hot-spot WLAN discovery range from the inter-working service server 105 in the common core network 101.

The modem selection unit 404 activates the modem based on the information received from the network discovery unit 401, the information on the modem determined to be activated.

FIG. 8 shows a diagram of the configuration of the inter-working service server according to the exemplary embodiment of the present invention.

As shown in FIG. 8, the inter-working service server includes a network discovery information storage unit 501, a range selection unit 502, a signal strength recording unit 503, and a transmit/receive unit 504. In this case, the inter-working service server is positioned in the common core network for providing the inter-working operation to the heterogeneous wireless networks, and is accessed to the multi-mode terminal through the common core network.

The transmit/receive unit 504 performs the wireless interface operation with the multi-mode terminal that has accessed the common core network.

The network discovery information storage unit 501 receives the propagation environment information message (here, the propagation environment information message includes signal information received from the heterogeneous wireless networks) through the transmit/receive unit 504. In addition, the network discovery information storage unit 501 divides the signal information in the propagation environment information message into sections according to the distances to the multi-mode terminal. In addition, the network discovery information storage unit 501 stores a crossing region of the divided sections.

The range selection unit 502 receives the propagation environment information message through the transmit/receive unit 504, and determines if the received signal information in the propagation environment information message corresponds to the crossing region stored in the network discovery information storage unit 501. When the received signal information corresponds to the crossing region stored in the network discovery information storage unit 501, the range selection unit 502 selects the crossing region as the network discovery range.

The signal strength recording unit 503 stores the signal information, which is received from the heterogeneous wireless networks, in the network discovery range selected by the range selection unit 502.

The above described methods and apparatuses are not only realized by the exemplary embodiment of the present invention, but, on the contrary, are intended to be realized by a program for realizing functions corresponding to the configuration of the exemplary embodiment of the present invention or a recoding medium for recoding the program. While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

As described above, a battery power source of the multi-mode terminal may be efficiently used, and a wireless network for providing a service may be quickly and accurately detected, according to the exemplary embodiment of the present invention.

In addition, in a system discovery method using the hotspot discovery range information of the inter-working service server, it is not required to additionally provide mounting modules including the GPS, and therefore a load may be minimized and reliability of the information may be increased.

What is claimed is:

1. A method of discovering a wireless network for a handover operation by a multi-mode terminal accessing respective wireless networks through a common core network, so as to provide an inter-working operation between overlapped heterogeneous wireless networks, the method comprising:
   a) transmitting a propagation environment information message to the common core network, the propagation environment information message generated by using signal information received from the heterogeneous wireless networks;
   b) receiving a wireless network discovery range from the common core network, the wireless network discovery range generated by using the propagation environment information message, wherein the wireless network discovery range includes information on a service coverage area for performing the handover operation;
   c) determining whether signal information received from a serving wireless network at a current location is within the wireless network discovery range;
   d) when the signal information received from the serving wireless network is within the wireless network discovery range in c), discovering a network within the wireless network discovery range; and
   e) when the signal information received by the serving wireless network is not within the wireless network discovery range in c), periodically performing c),
   wherein the wireless network discovery range corresponds to a crossing region of sections formed by dividing the signal information in the propagation environment information message according to distances to the multi-mode terminal.

2. The method of claim 1, wherein a) comprises:
   i) when an initial power source is activated, receiving the signal information from the heterogeneous wireless networks and measuring a strength of the signal information;
   ii) when the strength measured in i) is sufficient for access, generating the propagation environment information message by using the signal information; and
   iii) transmitting the propagation environment information message generated in ii) to the common core network.

3. The method of claim 1, wherein the propagation environment information message includes a base station identifier.

4. The method of claim 1, wherein the heterogeneous wireless networks comprise at least one among a wireless local area network (WLAN) system and a mobile communication system comprising a wideband code division multiple access (WCDMA) system.

* * * * *